United States Patent
Kehoe et al.

(12) 
(10) Patent No.: US 6,341,466 B1
(45) Date of Patent: Jan. 29, 2002

(54) CLIP FOR SECURING AN ELONGATE MEMBER TO A T-BAR OF A CEILING GRID

(75) Inventors: Kenneth H. Kehoe, Sandown, NH (US); Eric R. Rinderer, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/487,960

(22) Filed: Jan. 19, 2000

(51) Int. Cl.[7] .............................. E04B 1/38; E04C 5/00
(52) U.S. Cl. ................................ 52/712; 52/28; 52/39; 52/506.07; 24/292; 24/295; 24/563; 248/227.4; 248/300; 248/201; 248/906; 403/187; 403/188; 403/279; 403/326; 403/327
(58) Field of Search ......................... 24/292, 295, 563; 52/28, 39, 712, 506.07; 248/227.4, 300, 201, 906; 403/187, 188, 279, 282, 326, 327, 329, 397, 398, 399, 403, 382

(56) References Cited

U.S. PATENT DOCUMENTS

| | | |
|---|---|---|
| 977,704 A | 12/1910 | Brownlee |
| 1,611,783 A | 12/1926 | Schirmer |
| 1,929,302 A | 10/1933 | Boyle |
| 2,109,213 A | 2/1938 | Fearing |
| 2,523,785 A | 9/1950 | Sereno |
| 2,658,247 A | 11/1953 | Heuer |
| 2,723,432 A | 11/1955 | Flora |
| 3,023,470 A | 3/1962 | Patten |
| 3,055,686 A | 9/1962 | Havener |
| 3,181,826 A | 5/1965 | Kindorf |
| 3,187,854 A | 6/1965 | Lydard |
| 3,508,730 A | 4/1970 | Knezo, Jr. |
| 3,806,994 A | 4/1974 | Lankford |
| 3,816,880 A * | 6/1974 | Jacobs ..................... 24/73 B |
| 4,114,326 A * | 9/1978 | Macuga ...................... 52/28 |
| 4,358,216 A | 11/1982 | Pleickhardt et al. |
| 4,723,749 A * | 2/1988 | Carraro ..................... 248/317 |
| 4,826,078 A | 5/1989 | Arvin et al. |
| 4,905,952 A * | 3/1990 | Pinquist .................... 248/317 |
| 5,038,430 A | 8/1991 | Bly |
| 5,509,636 A * | 4/1996 | Cotungo ..................... 249/91 |
| 5,722,509 A | 3/1998 | Clinger |
| 5,971,329 A * | 10/1999 | Hickey .................... 248/68.1 |

FOREIGN PATENT DOCUMENTS

GB         1039646       *   8/1966

OTHER PUBLICATIONS

"Spring Steel Fasterners Product And Application Guide", Published in 1993 by B–Line Systems, Inc., pp. 38, 39, and 47–54.

* cited by examiner

Primary Examiner—Carl D. Friedman
Assistant Examiner—Dennis L. Dorsey
(74) Attorney, Agent, or Firm—Senniger, Powers, Leavitt & Roedel (57) ABSTRACT

A new and useful clip is disclosed for securing an elongate member, or lather's channel, to a horizontal T-bar of a ceiling grid, conventionally used to form a drop ceiling. The clip comprises a body having a downwardly opening recess therein for permitting the body to be placed over the lather's channel, without removing the channel from the T-bar. The lather's channel is in a seated position in which the channel is received in the recess of the clip. The clip has clasps depending from the body configured so that as the body is moved toward its seated position, the clasps assume positions on opposite sides of the stem of the T-bar for clasping the T-bar and securing the clip to the T-bar. The clip further includes a spring finger formed integrally with the body. The finger is engageable with the lather's channel as the body is moved to its seated position. The spring finger is moved from a relaxed condition to a sprung condition in which it exerts a spring force against the lather's channel to hold it within the recess of the clip.

16 Claims, 12 Drawing Sheets

Fig. 14 ated grid. The method comprises the steps of placing the elongate member on the head of the T-bar, and securing the elongate member to the T-bar in a position in which the member extends at an angle relative to the T-bar by using a clip having a body having a downwardly opening recess therein and clasps depending from the body. In accordance with the method of this invention, the body is placed over the elongate fixture member, without removing the member from the framing, in a seated position in which the member is received in the recess and the clasps extend down on opposite sides of the stem of the T-bar and engage opposite faces of the stem to secure the clip to the T-bar.

CLIP FOR SECURING AN ELONGATE MEMBER TO A T-BAR OF A CEILING GRID

BACKGROUND OF THE INVENTION

This invention relates generally to devices for mounting elongate members, such as lather's channel, on T-bars of a ceiling grid.

Lights, speaker boxes, fire alarm boxes and other fixtures are commonly mounted on the T-bars of a ceiling grid. Many of these fixtures are mounted on elongate members, typically lather's channels, which span parallel T-bars of the grid. For example, light fixtures are typically mounted on a pair of spaced apart, generally parallel, lather's channels which are then placed on the ceiling grid with the ends of the channels positioned on parallel T-bars of the grid. Various devices have been used to secure the lather's channels to the T-bars. The most common method is to use clips of the type which must first be installed on the T-bars at locations estimated to correspond to the spacing between the two channels. The clips have upwardly opening slots or recesses which then receive the channels. However, if the spacing between the clips as mounted on the T-bars is not precise, the position of the clips must readjusted to correspond to the spacing between the channels. Similarly, if conduit is placed on the ceiling grid, it must be lifted off the grid and placed in the clips after they have been installed on the T-bar. These methods are inconvenient and waste time.

There is a need, therefore, for a clip which can be used to secure elongate members, such as lather's channels, to ceiling grid in a more convenient fashion.

SUMMARY OF THE INVENTION

Among the several objects of this invention may be noted the provision of an improved clip for securing an elongate member to a T-bar of a ceiling grid; the provision of such a clip which can be applied after the elongate member has been positioned on the T-bar; the provision of such a clip which can be used to secure various types of members, including lather's channels and conduit; the provision of such a clip which is easy to install without the use of special tools; the provision of such a clip which is strong and capable of securely holding a member in place against both lateral and longitudinal movement relative to the T-bar; and the provision of such a clip which can be quickly installed, thereby reducing labor time.

In general, a clip of the invention is used for securing an elongate member to a horizontal T-bar of a ceiling grid. The T-bar has a base, a stem extending up from the base, and a head at the upper end of the stem. The elongate member is adapted to be secured to the T-bar in a generally horizontal position extending at an angle to the T-bar and resting on the head of the T-bar. The clip comprises a body having a downwardly opening recess therein for permitting the body to be placed over the elongate member without removing the member from the T-bar. The clip is placed in a seated position in which the member is received in the recess. Clasps depending from the body are configured so that as the body is moved toward its seated position, the clasps assume positions on opposite sides of the stem of the T-bar for clasping the T-bar and securing the clip to the T-bar.

In a second embodiment of the present invention, the clip incorporates a device which is engageable with the elongate member when the body is in the seated position. The device holds the elongate member against movement of the member in a longitudinal direction with respect to the member.

The present invention further involves a method of securing an elongate member to a horizontal T-bar of a ceiling Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
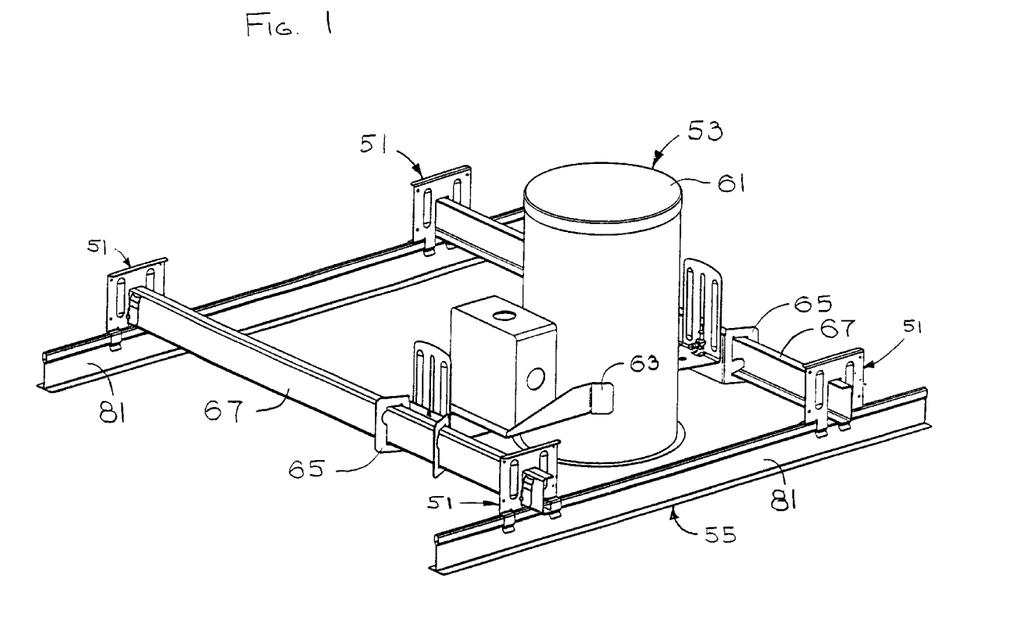
FIG. 1 is a perspective view of a light fixture assembly secured to a ceiling grid by several clips of the present invention.
Figure 2:
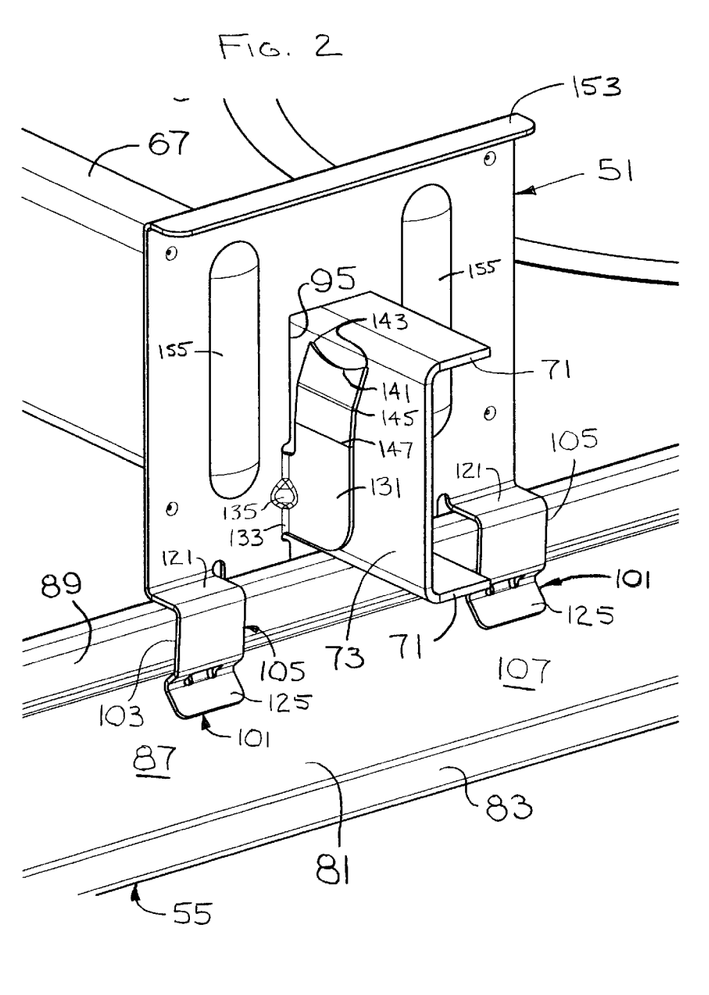
FIG. 2 is an enlarged portion of FIG. 1 showing one of the clips holding a lather's channel on a T-bar of the ceiling grid.
Figure 3:
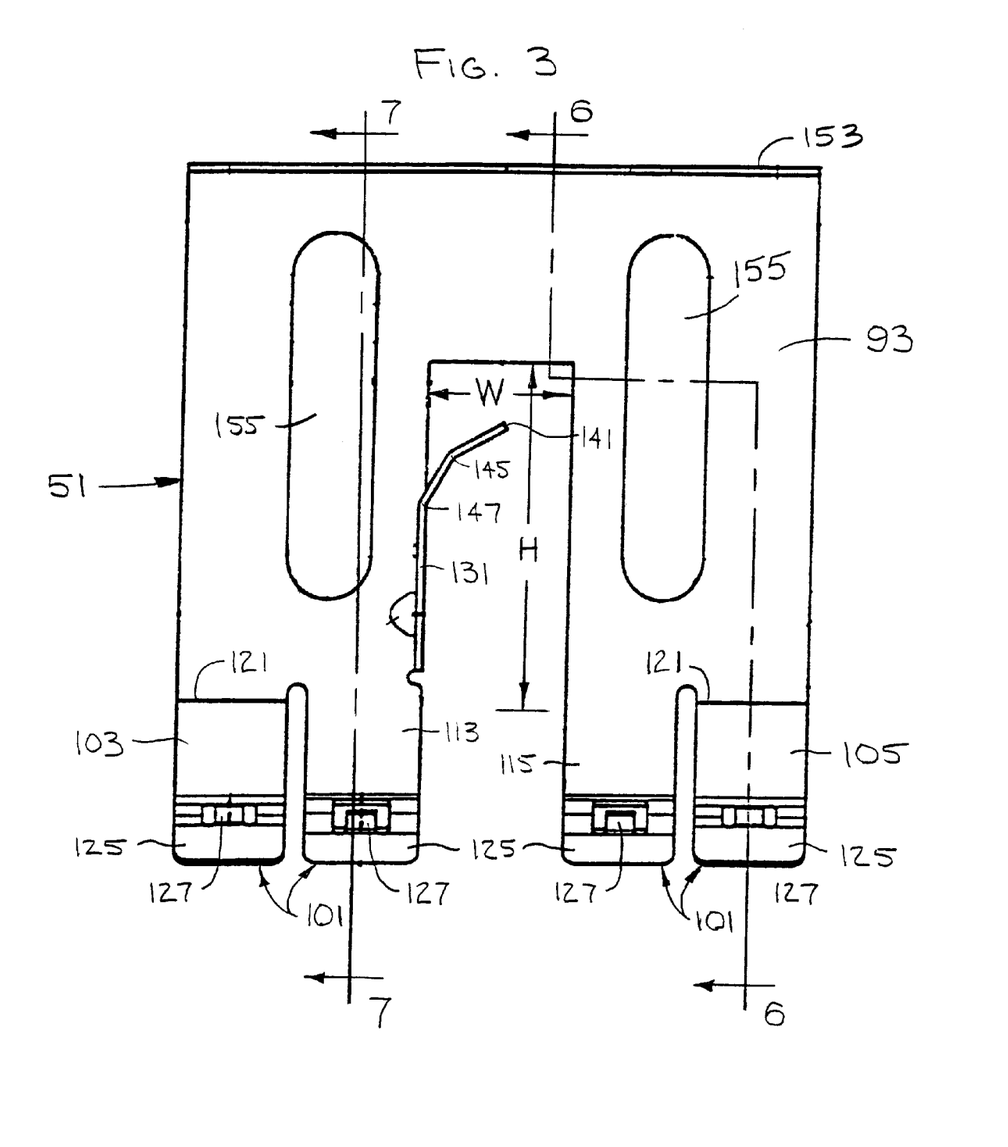
FIG. 3 is a front elevational view of the clip of FIG. 2.
Figure 4:
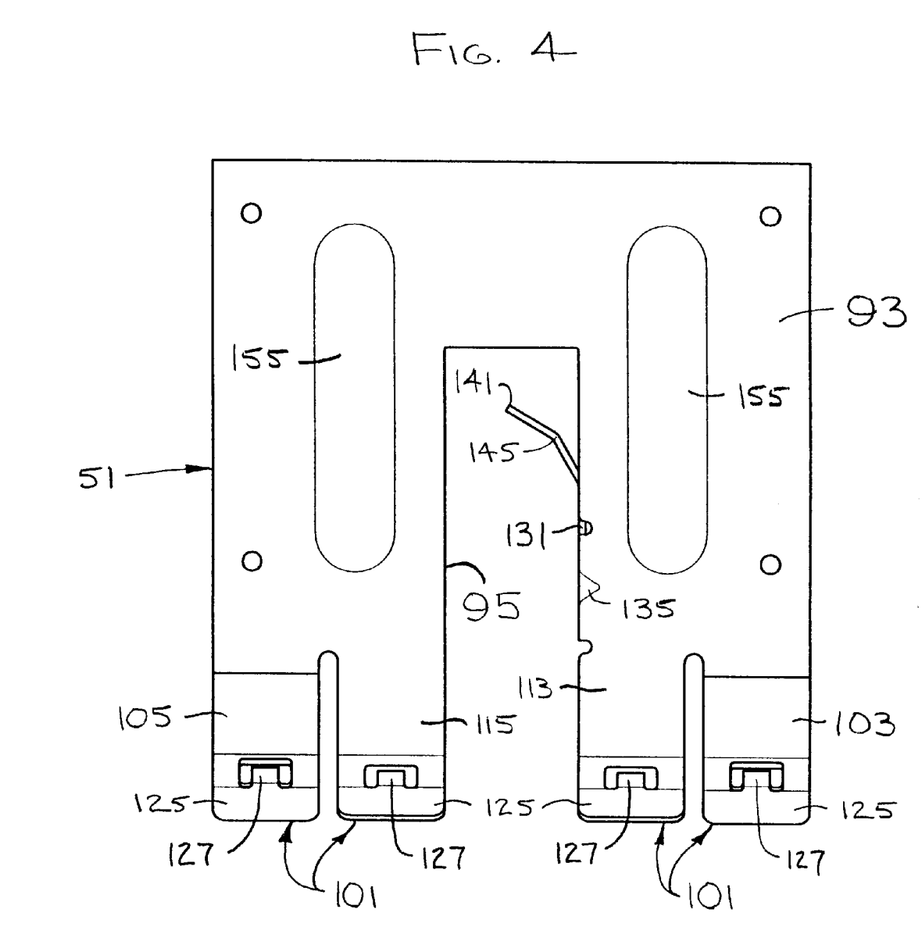
FIG. 4 is a rear elevational view of the clip of FIG. 2.
Figure 5:
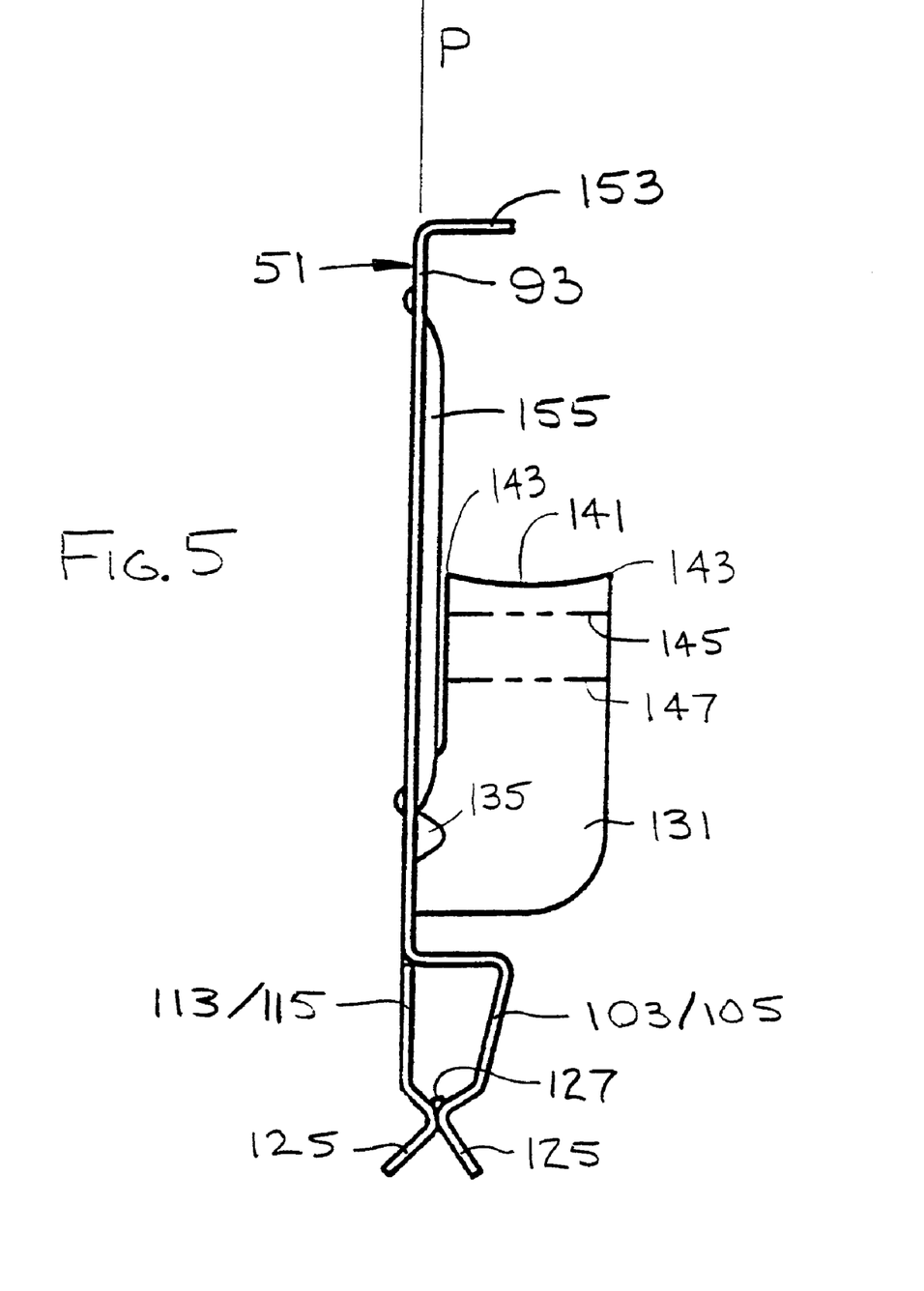
FIG. 5 is a left side elevational view of the clip shown in FIG. 3.
Figure 6:
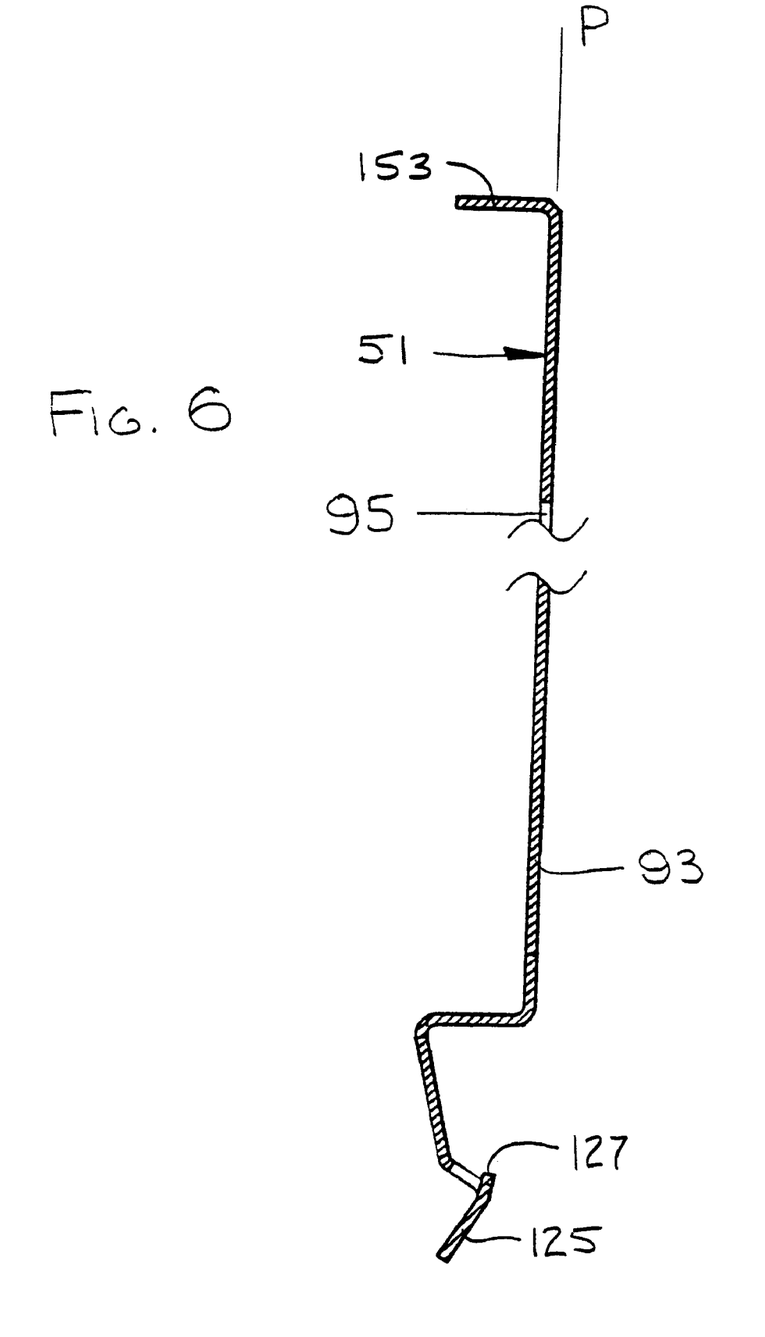
FIG. 6 is a sectional view taken in the plane of 6—6 in FIG. 3.
Figure 7:
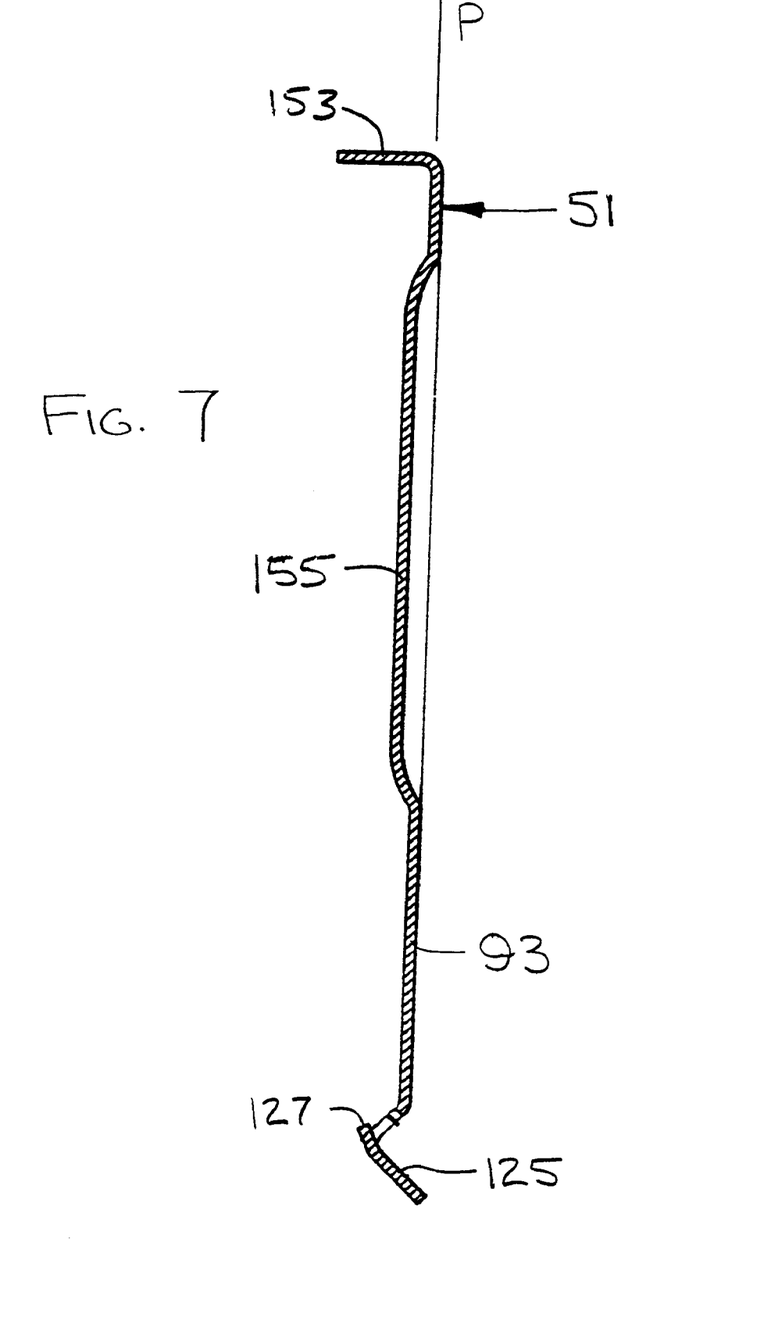
FIG. 7 is a sectional view taken in the plane of 7—7 in FIG. 3.

Referring now to the drawings and specifically to FIG. 1, a clip of the present invention is indicated in its entirety by the reference numeral 51. Several such clips are illustrated as securing a light fixture assembly, generally designated 53, to a ceiling grid, generally designated 55. As illustrated, the light fixture assembly 53 includes a lamp housing 61, a housing bracket 63, and two side clamps 65 for mounting the assembly on a pair of elongate members 67. These members are illustrated as being conventional lather's channels 67. As shown best in FIG. 2, each channel 67 comprises a pair of horizontal flanges 71 connected by a vertical web 73. The channel 67 is typically formed from sheet metal having a thickness of between 0.030 and 0.090 inches. A lather's channel 67 typically has a nominal height (i.e., web width) of 1.5 inches and a width (i.e., flange depth) of 0.50–0.625 inches. It will be understood that elongate members other than lather's channels can be used without departing from the scope of this invention.

The aforementioned grid 55 comprises a plurality of framing members, typically in the form of T-bars 81. Each T-bar 81 is typically an elongate member formed from metal and shaped like an inverted "T" in cross section. The "T" cross-sectional shape adds rigidity and functionality to the T-bar 81. The T-bar 81 has a base 83 constituted by a horizontal flange, a vertical stem 87 extending up from the base 83, and a head 89 in the form of a hollow bulb at the upper end of the stem. In conventional building applications, T-bars 81 are arranged orthogonally to form the grid 55 that acts as a framework for a drop ceiling (not shown). Opaque panels situated within the spaces of the T-bar 81 framework complete the drop ceiling. Drop ceilings arranged horizontally, a distance below a true ceiling, create a space between the drop ceiling and the true ceiling where electrical, plumbing, climate control, and other equipment may be hidden from view. Some articles, such as lights, speaker boxes, fire alarm boxes, and other fixtures, are preferably not fully hidden from view. Those fixtures typically attach to the T-bar 81 framework above the drop ceiling, having only a lower portion of the fixture extending down and through a hole cut in the panel. Therefore, drop ceilings allow fixtures to be selectively revealed or hidden from view.

Conventionally, various devices have been used to secure lather's channels 67 to T-bars 81. The most common method is to use upwardly opening clips (not shown). These clips have a body with downwardly extending legs for gripping the T-bar 81 and an upwardly opening recess for receiving the lather's channel 67 and holding it in place. Because of the upwardly opening clips, workers must first install the clips on the T-bars 81 at locations estimated to correspond to the spacing between the two lather's channels 67. After estimating the proper clip locations along the T-bar 81, the lather's channels 67, with the fixture attached, must fit into the upwardly opening recesses of the clips. Because the initial clip locations are merely estimates, the worker must often reposition the conventional clips to a proper location, which requires that the worker either put the fixture assembly down before repositioning the clips or reposition the clips while supporting the weight of the fixture and holding the fixture it its desired location. In either case, the procedure is awkward and inefficient.

The clip 51 of the present invention solves the aforementioned problem because it allows the fixture 53 and lather's channels 67 to be placed as a complete assembly on top of the T-bar 81 ceiling grid 55 and then secured in position without moving the assembly. After the assembly has been properly positioned, the worker installing the fixture 53 simply pushes the clips 51 down over the lather's channels 67 and into engagement with the T-bar 81, thereby holding the assembly in position. The fixture 53 need not be put down or held in place while adjusting the clips 51 since clip installation occurs after final positioning of the fixture. Thus, the clips 51 increase the efficiency of installation, removing the awkward step of either putting the fixture in a different location while the clips are repositioned or holding the fixture 53 near the T-bars 81 while attempting to adjust the clips during installation.

As illustrated in FIGS. 3–7, a clip 51 of the present invention has a generally planar body 93 formed from heat treated sheet metal, preferably sheet steel having a thickness of 0.030–0.034 inches. The body 93 has a downwardly opening recess 95, permitting the body to be placed over the lather's channel 67 with the channel received in the recess. The preferred recess 95 is a rectangular notch, having a width W (FIG. 3) of greater than 0.625 in. for receiving 0.50 in. to 0.625 in. wide lather's channel 67 and a height H (FIG. 3) of greater than 1.5 in. for receiving 1.5 in. tall lather's channel. The clip 51 is installed over the lather's channel 67 while the channel rests in a seated position on the T-bars 81, without removing the channel from the T-bars.

Figure 8:
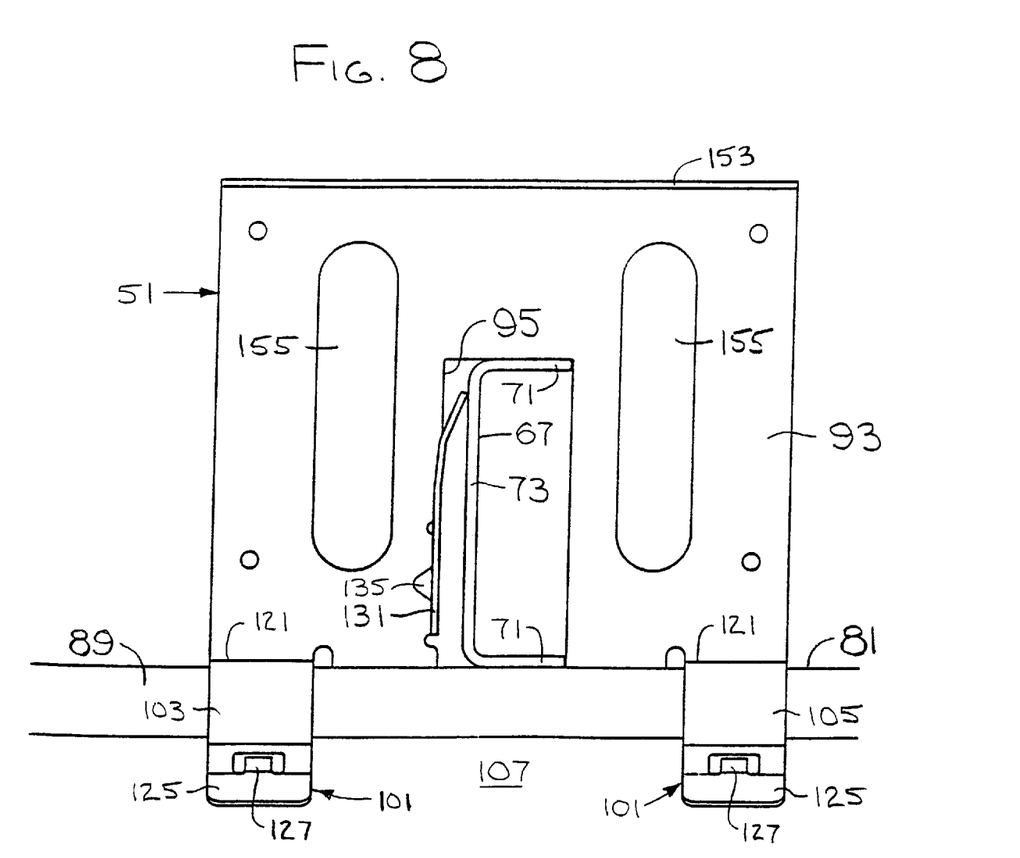
FIG. 8 is a front view of the clip holding a lather's channel on the T-bar.
Figure 9:
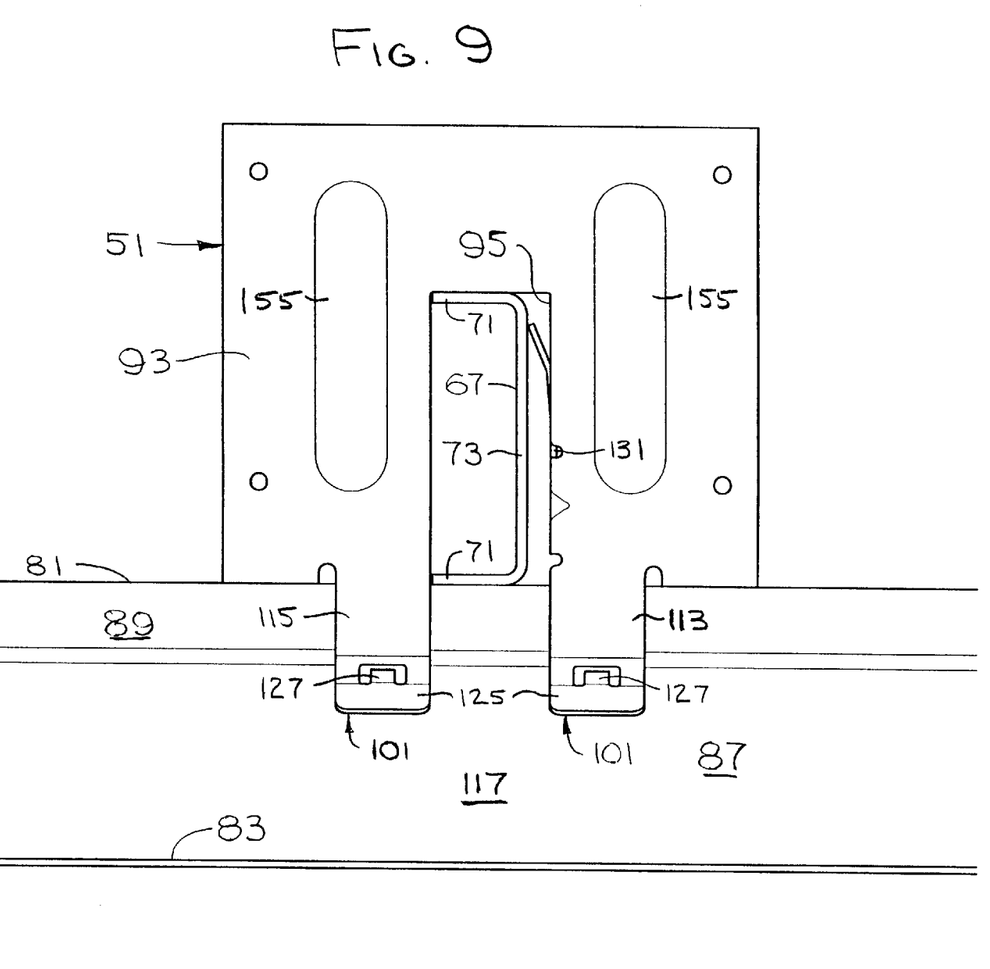
FIG. 9 is a rear view of the clip holding a lather's channel on the T-bar.
Figure 10:
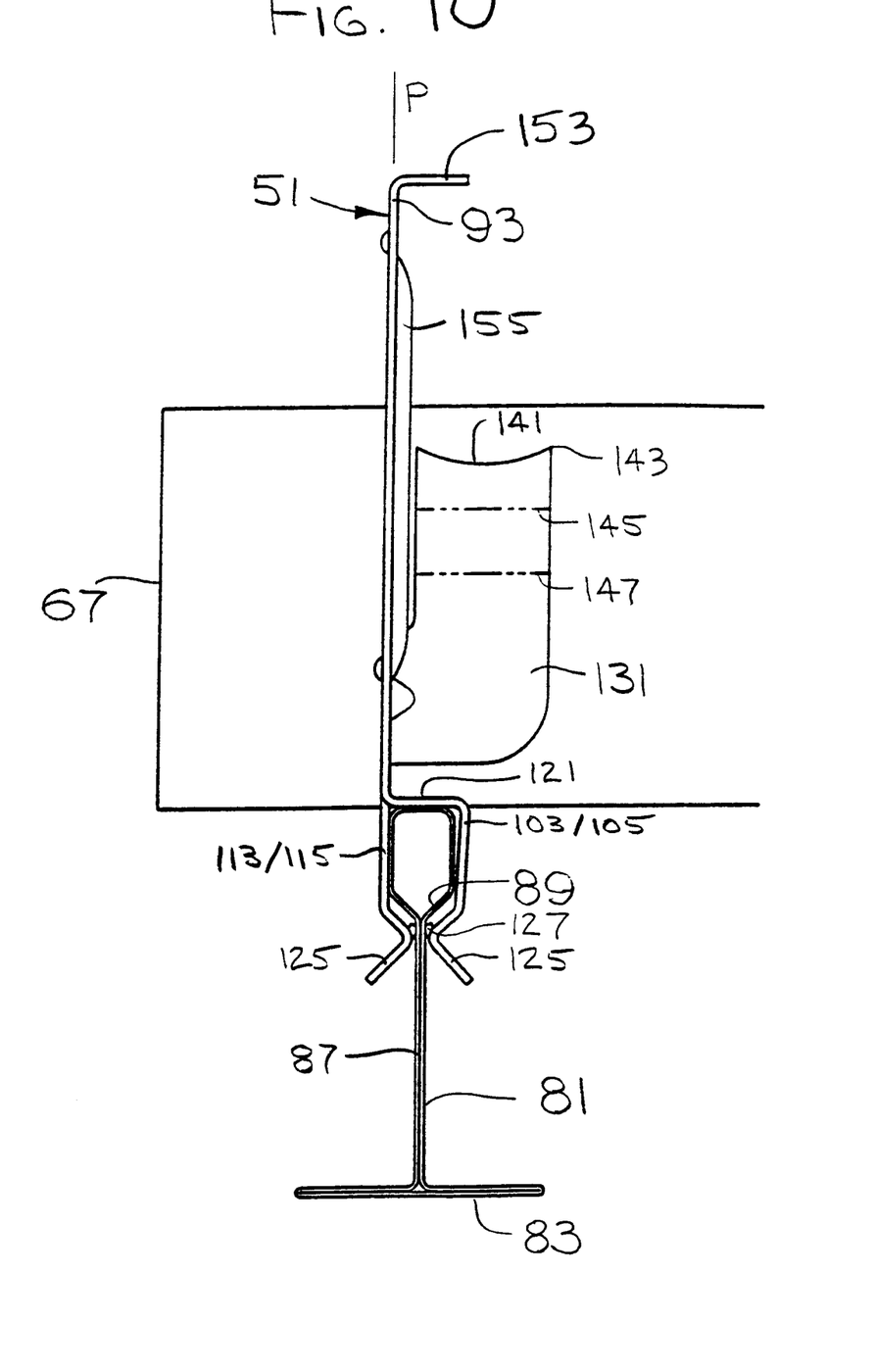
FIG. 10 is a left side elevational view of the clip and T-bar shown in FIG. 8.

A plurality of clasps, generally indicated at 101, depend from the body 93 of the clip 51 so that as the body is pushed down over the lather's channel 67 toward the seated position shown in FIG. 8, the clasps assume positions on opposite sides of the head 89 and stem 87 of the T-bar 81 for clasping the T-bar and securing the clip to the T-bar. In the embodiment shown in FIGS. 8–9, each clip 51 has four clasps 101 comprising an outer pair of spring legs designated 103 and 105 which extend down from the body 93 adjacent opposite sides of the body for engagement with a first face 107 of the stem 87 of the T-bar 81, and an inner pair of spring legs designated 113 and 115 which extend down from the body between the outer spring legs immediately adjacent opposite sides of the recess 95 for engagement with a second face 117 of the stem 87 opposite the first face. The outer legs 103,105 are bent to have horizontal shoulders 121 adjacent their upper ends (FIG. 10). When fully seated on the T-bar 81, these shoulders 121 contact the top of the head 89 of the T-bar, inhibiting further downward movement of the clip 51. The lower ends of the outer 103,105 and inner spring legs 113,115 have feet 125 angled laterally outwardly away from the central plane P of the body to guide the spring legs 103,105,113,115 over the head 89 of the T-bar 81.

The clasps 101 function so that as the body 93 moves toward its seated position against the top of the T-bar 81, the spring legs 103,105,113,115 assume positions on opposite sides of the stem 87 of the T-bar 81 for clasping the T-bar and securing the clip 51 to the T-bar. The spring legs impart a clamping force upon the T-bar 81, thereby facilitating retention of the clip 51 on the T-bar. Additionally, the spring legs 103,105,113,115 have tabs 127 lanced therefrom that extend upwardly and inwardly from the legs for engagement with the first and second stem faces 107,117. These tabs 127 bite into the stem 87 of the T-bar 81, further securing the clip 51 to the T-bar. Once the clip 51 is fully seated on the T-bar 81, the tabs 127 engage the stem 87 below the head 89, inhibiting the clip from moving upward as the tabs will bite into the head if an upward force is exerted upon the clip. The collective clamping force exerted by the spring legs 103, 105,113,115 and the tabs 127 ensures that the clips 51 do not move with respect to the T-bar 81 or become inadvertently dislodged.

The body 93 further has a device comprising a spring finger 131 for holding the lather's channel 67 against movement of the channel within the clip 51 in a longitudinal direction with respect to the channel. The spring finger 131 is integrally formed from the body 93 of the clip 51, being arranged at a right angle to the body and connected at its lower end to the body along a vertical bend line 133 near an edge of the recess 95. A stiffening rib 135 located near the center of the bend 133 reinforces the bend. The spring finger 131 has a free upper end 141 formed with at least one tooth 143 (two are shown in the preferred embodiment) thereon adapted for biting into the vertical web 73 of the lather's channel 67. These teeth 143 hold the lather's channel 67 against movement of the channel in the longitudinal direction. The spring finger 131 has a first transverse bend line 145 spaced in from its upper end 141, and a second transverse bend line 147 spaced in from the first bend line. The upper end portion 141 of the spring finger 131 slopes inwardly into the recess 95 from these bend lines 145,147. The preferred angle of the spring finger 131 above the first bend line 145 is about 60° off vertical as the angle of the spring finger above the second bend line 147 and below the first bend line is about 30° off vertical, the finger thus creating an interference within the projected area of the recess. As the clip 51 is pushed down toward its seated position against the lather's channel 67, the lather's channel moves the spring finger 131 outward from a relaxed condition (FIGS. 3–4) to a deflected condition (FIGS. 8–9) in which it exerts a spring force against the channel 67 to hold the channel against the opposite edge of the recess 95, thereby inhibiting longitudinal movement of the lather's channel.

The body 93 of the clip 51 has a flange 153 along an upper edge thereof extending generally at a right angle to the body. The flange 153 extends the full width of the clip 51, providing a horizontal surface for pushing the body 93 down to its seated position over the lather's channel 67 and T-bar 81. The flange 153 surface is of an adequate area to allow the clip 51 to be easily pressed down onto the T-bar 81 manually. Furthermore, the clip 51 body 93 has at least two vertical, oblong stiffening ribs 155 on opposite sides of the recess 95. The stiffening ribs 155 strengthen the clip 51, ensuring that the clip retains its shape, without deformation, during installation and use. The ribs 155 may be of any number and shape without departing from the scope of the invention.

Figure 11:
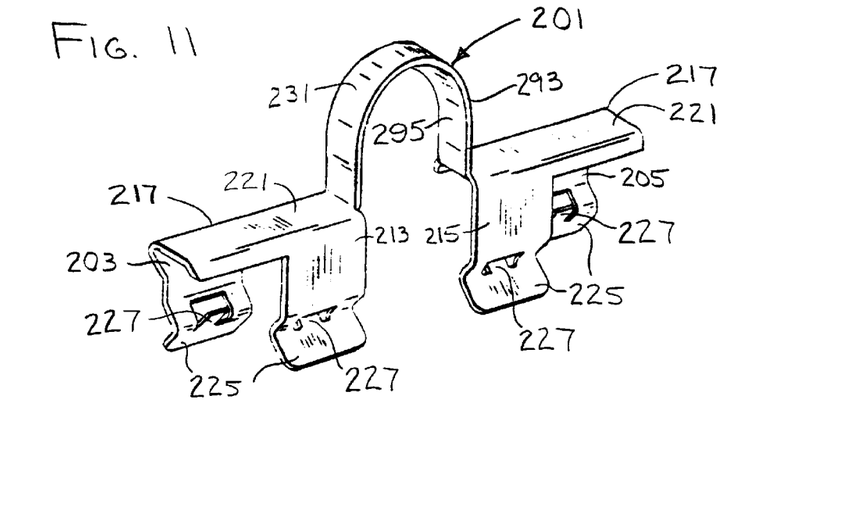
FIG. 11 is a perspective view of a clip with a recess shaped for receiving a tubular member of circular cross section.
Figure 12:
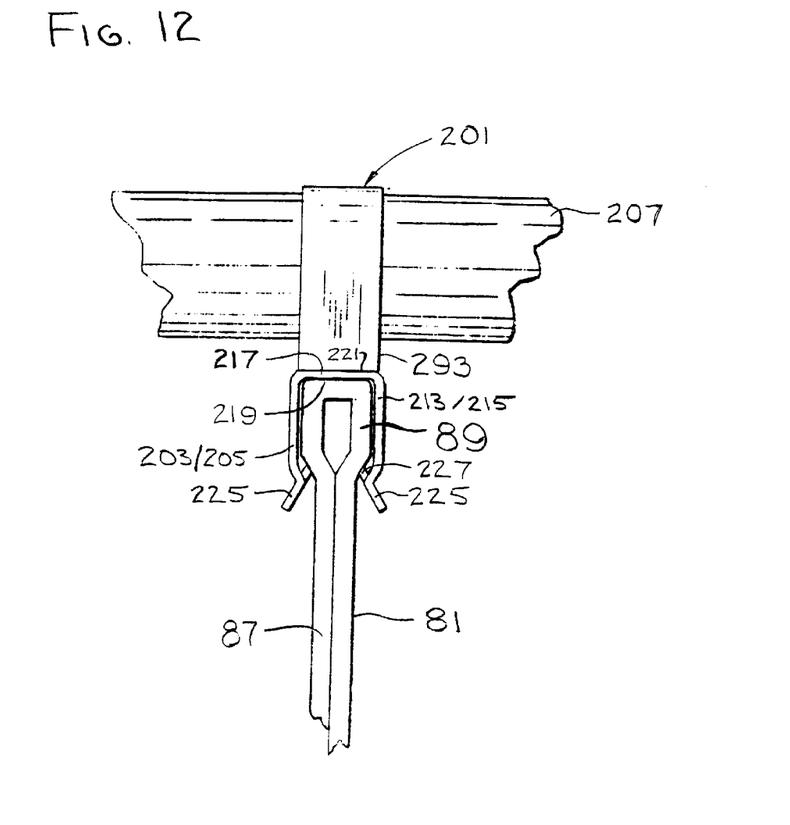
FIG. 12 is a side elevational view of the clip of FIG. 11 used to secure a tubular member to a T-bar.

FIGS. 11 and 12 show a second clip of the present invention, generally designated 201. In this embodiment, the body 293 of the clip 201 defines a recess 295 which is preferably hemispherical at its upper end 231 for receiving a tubular member of circular cross section 207. The shape of the recess 295 closely matches the cross sectional shape of the tubular member 207, creating a close fit between the tubular member and the clip 201. The close fit of the clip 201 helps hold the tubular member 207 in place, minimizing movement of the tubular member within the recess 295. The shape and size of the recess 295 may vary to accommodate differently-shaped tubular members without departing from the scope of the invention. The clip 201 is attachable to a T-bar 81 in a manner similar to the previous embodiment. A pair of shoulders 217 extend laterally outwardly from the lower lateral edges of the recess 295, providing a horizontal surface 219 engageable with the head 89 of the T-bar 81 and a bearing surface 221 for pressing the clip 201 over the head of the T-bar. Outer spring legs 203,205 and inner spring legs 213,215 having feet 225 with tabs 227 lanced therefrom, similar to the first embodiment, depend from the shoulders 217 for gripping the stem 87 of the T-bar 81.

Figure 13:
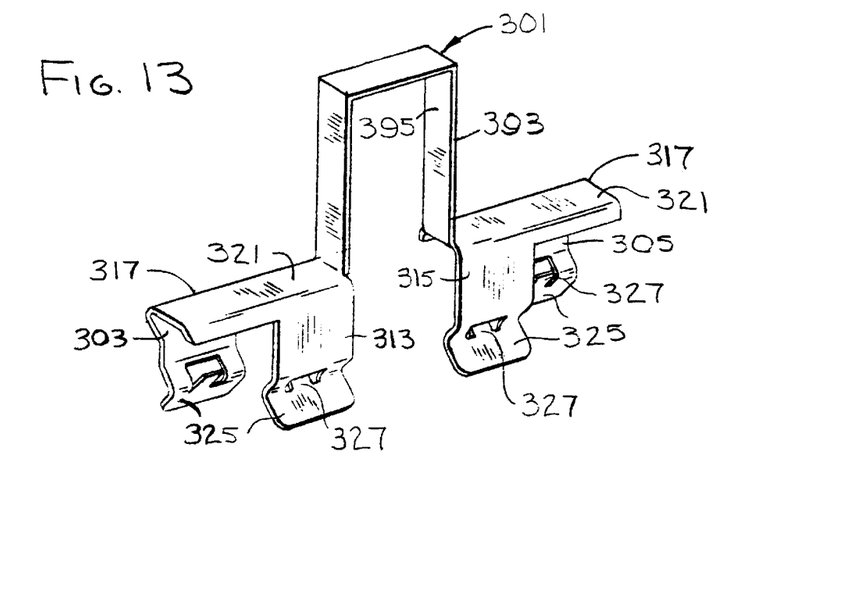
FIG. 13 is a front perspective view of a clip with a recess shaped for receiving a tubular member of rectangular cross section.
Figure 14:
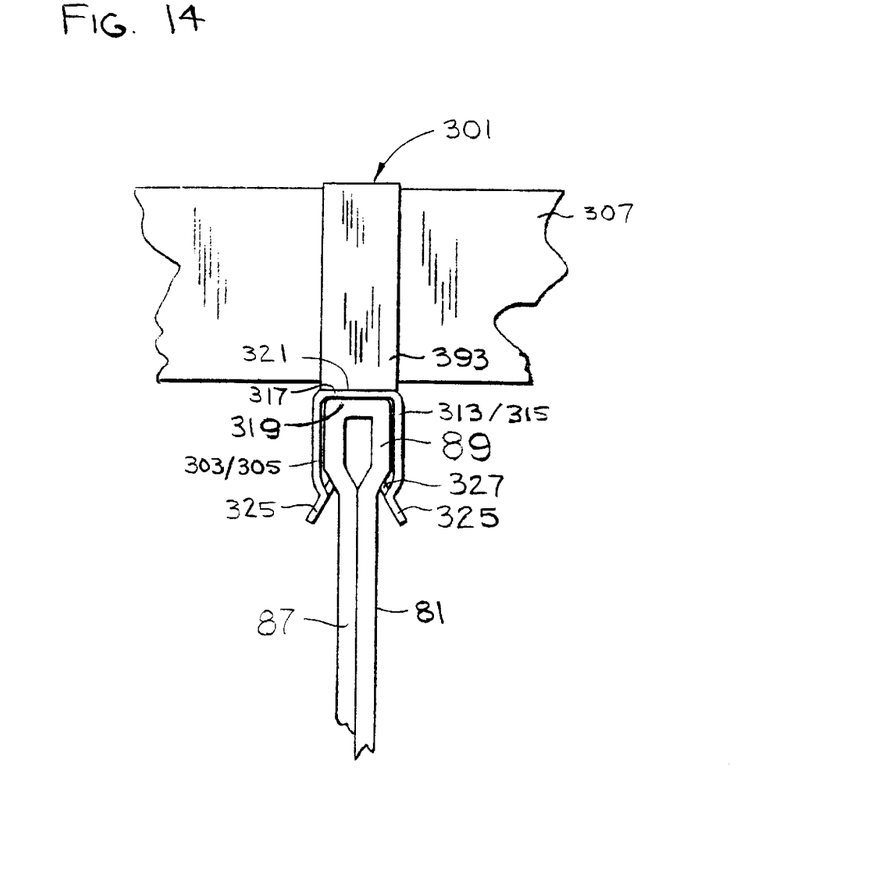
FIG. 14 is a side elevational view of the clip of FIG. 13 used to secure a tubular member to a T-bar.

FIGS. 13 and 14 show a third clip of the present invention, generally designated 301. In this embodiment, the body 393 of the clip 301 defines a recess 395 which is preferably rectangular for receiving a member of rectangular cross section 307. The shape of the recess 395 closely matches the cross sectional shape of the rectangular member 307, creating a close fit between the member and the clip 301. The close fit of the clip 301 helps hold the rectangular member 307 in place, minimizing movement of the member within the recess 395. The clip 301 is attachable to a T-bar 81 in a manner similar to the first embodiment. A pair of shoulders 317 extend laterally outwardly from the lower lateral edges of the recess 395, providing a horizontal surface 319 engageable with the head 89 of the T-bar 81 and a bearing surface 321 for pressing the clip 301 over the head of the T-bar.

Outer spring legs 303,305 and inner spring legs 313,315 having feet 325 with tabs 327 lanced therefrom, similar to the first embodiment, depend from the shoulders 317 for gripping the stem 87 of the T-bar 81.

In accordance with the method of the present invention, the clips 51,201,301 described above can be used to conveniently secure an elongate fixture member to a T-bar 81 of a ceiling grid 55. For example, four clips 51 can be used to secure the fixture assembly 53 of FIG. 1 to parallel T-bars 81 of a ceiling grid 55. According to the method, a worker places and properly positions multiple lather's channels 67 supporting a fixture 53 across multiple T-bars 81. Next, the worker secures the lather's channel 67 to the T-bar 81 using clips 51 of the present invention. The lather's channels 67 preferably lie at right angles to the T-bars 81, although other angles are contemplated as part of the disclosed invention. The worker secures the lather's channel 67 to the T-bar 81 by placing the body 93 of each clip 51 over the channel without removing the channel from the T-bar. The clip 51 is pushed down to its seated position in which the lather's channel 67 is received in recess 95 and the clasps 101 extend down on opposite sides of the T-bar 81 for engaging and securing to opposite sides of the stem 87. In a typical installation, as shown in FIG. 1, multiple clips 51 secure multiple pieces of lather's channel 67 to multiple T-bars 81.

In view of the above, it will be seen that the several objects of the invention are achieved and other advantageous results attained.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A clip for securing an elongate member to a horizontal T-bar of a ceiling grid, said T-bar having a base, a stem extending up from the base, and a head at the upper end of the stem, said elongate member being adapted to be secured to the T-bar in a generally horizontal position extending laterally with respect to the T-bar and resting on the head of the T-bar, said clip comprising a body having a top, a bottom and a recess extending up from the bottom for placement of the clip on the elongate member, without removing the member from the T-bar, with the elongate member received in the recess, said body having integral portions on opposite sides of the recess, each said portion being formed for engagement with the top of the head of the T-bar and having a pair of downwardly extending spring legs for straddling and extending underneath the head of the T-bar to clasp onto said head, a first leg of each said pair of legs being adjacent the recess on the respective side thereof and the second leg of each said pair of legs being on the outside of the first leg thereof, said body comprising a sheet metal plate having said top and bottom and said recess extending up generally centrally thereof from the bottom, said plate having said side portions on opposite sides of the recess, each said side portion having a slit extending up from the bottom of the plate dividing it into a first section adjacent the recess and a second section outward of the first section, one of said sections being doubly bent to form a shoulder for engagement with the top of the head of the T-bar and one of said legs and the other section constituting the other leg.

2. A clip as set forth in claim 1 wherein each said other leg is coplanar with respect to the plate.

3. A clip as set forth in claim 2 wherein said spring legs have tabs struck therefrom for biting into the T-bar to inhibit the clip from riding up off the T-bar.

4. A clip as set forth in claim 2 wherein said legs have feet at lower ends thereof angled laterally outwardly away from the plane of the body to guide the spring legs over the head of the T-bar.

5. A clip as set forth in claim 2 wherein said plate has a toothed spring finger bent out therefrom at one side of the recess engageable with the elongate member for holding the elongate member against longitudinal movement on the T-bar.

6. A clip as set forth in claim 5 wherein said spring finger is engageable by the elongate member as the elongate member is received in the recess whereby the spring finger is moved from a relaxed condition to a sprung condition in which it exerts a spring force against the elongate member to hold it.

7. A clip as set forth in claim 6 wherein said spring finger has an upper end formed with at least one tooth thereon adapted for biting into said elongate member.

8. A clip as set forth in claim 6 wherein said spring finger has an upper end, a first transverse bend line spaced in from the upper end, and a second transverse bend line spaced in from the first bend line.

9. A clip for securing an elongate member to a horizontal T-bar of a ceiling grid, said T-bar having a base, a stem extending up from the base, and a head at the upper end of the stem, said elongate member being adapted to be secured to the T-bar in a generally horizontal position extending laterally with respect to the T-bar and resting on the head of the T-bar, said clip comprising a body having a top, a bottom and a recess extending up from the bottom for placement of the clip on the elongate member, without removing the member from the T-bar, with the elongate member received in the recess, said body having integral portions on opposite sides of the recess, each said portion being formed for engagement with the top of the head of the T-bar and having a pair of downwardly extending spring legs for straddling and extending underneath the head of the T-bar to clasp onto said head, a first leg of each said pair of legs being adjacent the recess on the respective side thereof and the second leg of each said pair of legs being on the outside of the first leg thereof, wherein said body has a central part generally of inverted U-shape defining said recess, said integral side portions being constituted by elongate shoulders extending laterally outward from the lower ends of the inverted U, said legs extending down from longitudinal edges of the shoulders.

10. A clip as set forth in claim 9 wherein said body has a flange along an upper edge thereof extending generally at right angles to the body for providing a surface for pushing the body down to its seated position.

11. A clip as set forth in claim 9 wherein said body has at least two vertical stiffening ribs thereon on opposite sides of the recess.

12. A clip as set forth in claim 1 wherein said recess is rectangular for receiving an elongate member in the form of lather's channel.

13. A clip as set forth in claim 12 wherein said recess has a width greater than 0.6251" for receiving both 0.50"-wide and 0.625"-wide lather's channel.

14. A clip as set forth in claim 1 wherein said recess is shaped for receiving a member of circular cross section.

15. A clip for securing an elongate member to framing in a position in which the elongate member rests on the framing and extends laterally relative to framing, said clip comprising:

a body having a downwardly opening recess therein for permitting the body to be placed over the elongate member, without removing the member from the framing, to a position in which the member is received in the recess, spring legs formed integrally with the body and extending downwardly therefrom, said spring legs being adapted to assume positions on opposite sides of the framing when the elongate member is received in the recess for clasping the framing and thereby securing the clip to the framing, and a spring device on the body engageable with the elongate member when the elongate member is in the recess for holding the elongate member against movement of the member in a longitudinal direction with respect to the member.

16. A clip as set forth in claim 15 wherein said spring device comprises a toothed spring finger formed integrally with said body at one side of said recess.

* * * * *